United States Patent [19]

Shutoh

[11] Patent Number: 5,864,631
[45] Date of Patent: Jan. 26, 1999

[54] METHOD AND APPARATUS FOR MUSICAL SCORE RECOGNITION WITH QUICK PROCESSING OF IMAGE DATA

[75] Inventor: Kazuhiko Shutoh, Hamamatsu, Japan

[73] Assignee: Yamaha Corporation, Hamamatsu, Japan

[21] Appl. No.: 587,250

[22] Filed: Jan. 16, 1996

Related U.S. Application Data

[63] Continuation of Ser. No. 101,378, Aug. 2, 1993, abandoned.

[30] Foreign Application Priority Data

Aug. 3, 1992 [JP] Japan .................................. 4-226392

[51] Int. Cl.$^6$ ...................................................... G06K 9/00
[52] U.S. Cl. .............................. 382/113; 84/462; 382/181
[58] Field of Search .................................... 382/100, 113, 382/192, 181, 173, 175, 219, 289, 296, 182; 84/470 R, 462, 76

[56] References Cited

U.S. PATENT DOCUMENTS

| | | | |
|---|---|---|---|
| 5,146,833 | 9/1992 | Lui | 84/462 |
| 5,202,526 | 4/1993 | Ohya | 84/462 |
| 5,233,168 | 8/1993 | Kulik | 382/45 |

FOREIGN PATENT DOCUMENTS

| | | |
|---|---|---|
| 59-57384 (A) | 4/1984 | Japan . |
| 61-62983 | 3/1986 | Japan . |
| 2-2765 | 1/1990 | Japan . |

OTHER PUBLICATIONS

"Automated Recognition System for Musical Score", Matsuchima et al. Bulletin of Science & Engineering Research Laboratory, Waseda University No. 112 (1985) pp. 25–52.

"An Efficient Method for the Recognition of Printed Music", Sicard, Proceedings 11th 1 Apr. Int'l Conf. on Pattern Rec. vol. III pp. 576–576, 1992.

"Recognition System for Printed Music Score", Kim et al. Proceedings TENCOM 87, Aug. 1987, pp. 573–577.

Martin et al. "Neural Networks for the Recognition of Engraved Musical Scores" in the International Journal of Pattern Recognition and Artifical Intelligence, vol. 6, No. 1, pp. 193–208, Jun. 1992.

*Primary Examiner*—Leo H. Boudreau
*Assistant Examiner*—Bhavesh Mehta
*Attorney, Agent, or Firm*—Graham & James LLP

[57] ABSTRACT

A musical score recognition apparatus is constructed for recording an image of a given musical score and for processing the recorded image to thereby recognize involved components so as to produce performance information according to the following methods. First, staffs are provisionally discriminated, and the recorded image is corrected according to an inclination of the discriminated staffs by shifting mark dots in parallel manner to either of horizontal and vertical directions. Second, the staffs are erased exclusively and segmentally to leave other components such as notes and symbols. Third, beams are also erased exclusively to leave notes and symbols on a working image. Fourth, the notes and symbols are recognized using a reference pattern composed of discrete characteristic points such that matching is tested between a given characteristic point and plural dots including central and peripheral dots. Fifth, during the course of determination of a duration between preceding and succeeding performance events based on the score recognition results, the duration of concurrent note events are determined according to a minimum note length of the involved notes.

13 Claims, 22 Drawing Sheets

FIG.18A  FIG.18B  FIG.18C
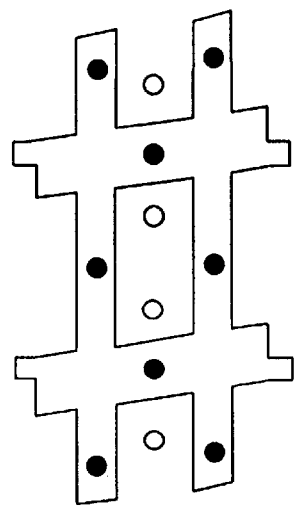
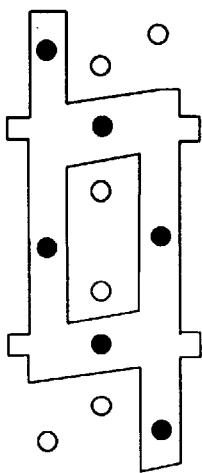
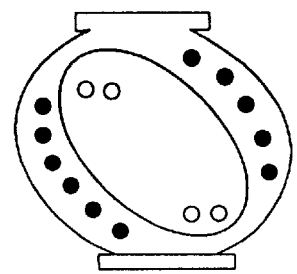
FIG.18D  FIG.18E  FIG.18F
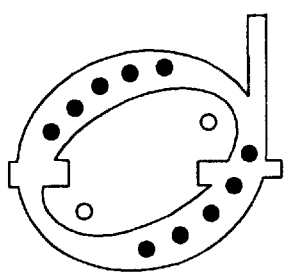
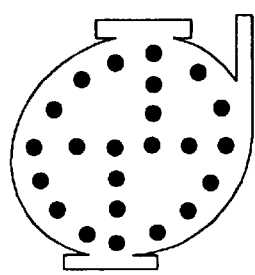
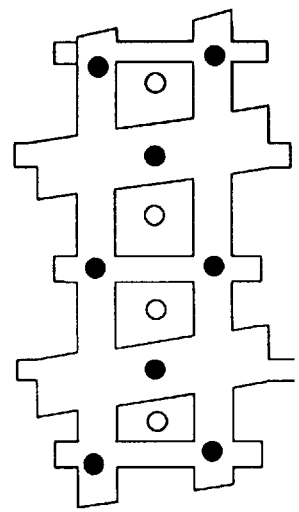

FIG.21
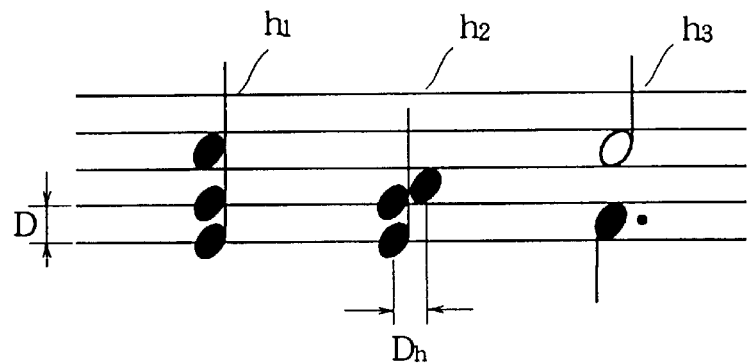
FIG.22A  FIG.22B
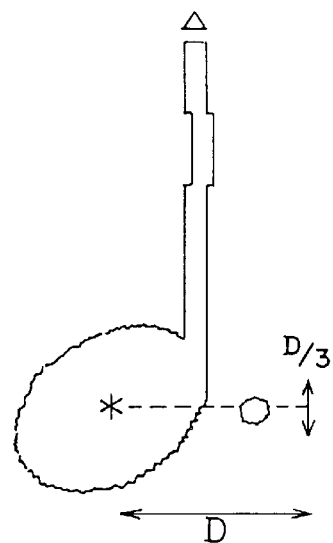 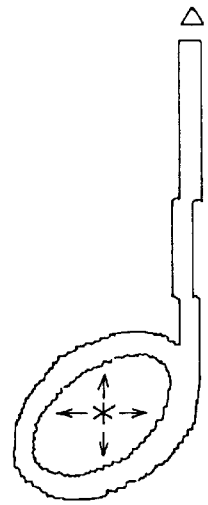
FIG.23
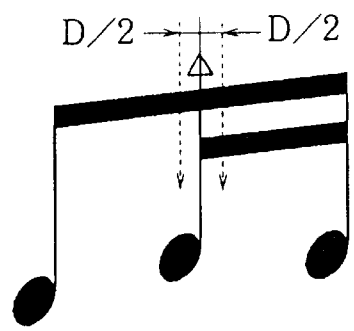

| Event index | Event type | Note length (clock number) | chord flag |
|---|---|---|---|
| a | C4 | 1/2 (48) | 0 |
| b | F3 | 1/4+dot (36) | 1 |
| c | G3 | 1/8 (12) | 0 |
| d | B3 | 1/8 (12) | 0 |
| e | E3 | 1/4 (24) | 1 |
| f | Rest | 1/8 (12) | 0 |
| g | Rest | 1/4 (24) | 0 |
| h | C4 | 1/4 (24) | 1 |

| | |
|---|---|
| [0] | — Duration |
| C4 (38) | — Note number / — Gate time |
| F3 (29) | — Note number / — Gate time |
| [36] | — Duration |
| G3 (10) | |
| [12] | |
| B3 (10) | |
| E3 (19) | |
| [24] | |
| ⋮ | |
| End | |

METHOD AND APPARATUS FOR MUSICAL SCORE RECOGNITION WITH QUICK PROCESSING OF IMAGE DATA

This is a continuation of application Ser. No. 08/101,378 filed on Aug. 2, 1993, now abandoned.

BACKGROUND OF THE INVENTION

The present invention relates to a musical score recognition method and apparatus for processing an image taken from a given musical score text by means of an image scanner or the like so as to recognize staffs, notes, symbols and their positions in the score, to thereby produce performance information containing a tone pitch, a sounding timing and a sounding duration, according to the recognition results.

Recently, it has been attempted to construct a system composed in combination of the musical score recognition apparatus and a sound source such as an electronic musical instrument provided with a Musical Instrument Digital Interface (MIDI). The system operates such that the image data taken from the given musical score text by the image scanner is processed to recognize and extract score information to produce an MIDI data according to the recognized score information, and such that the MIDI data is fed to the MIDI sound source to thereby achieve automatic performance according to the given musical score text by sequential data processing. In such a system, the typical data processing includes the following steps of: (1) sampling and recording a musical score image data; (2) detecting and recognizing staffs; (3) provisionally erasing the staffs; (4) detecting and recognizing bars; (5) provisionally erasing the bars; (6) detecting notes; (7) recognizing the notes; (8) erasing the notes; (9) detecting symbols; (10) recognizing the symbols; (11) erasing the symbols; (12) forming performance data; and (3) producing MIDI data to effect automatic performance.

The step (2) of detecting and recognizing the staffs is carried out such that the recorded image of the musical score is projected into a horizontal direction to calculate a histogram of mark dots piled on a vertical axis. Then, horizontally extending line components arranged at an equivalent interval are detected according to periodical peaks of the histogram to thereby recognize the staffs. The vertical positions or levels of the recognized staff lines are utilized as a basis for determine a pitch of notes recognized by the step (6). The detected staff lines are temporarily erased at the step (3) to avoid ill affect to the later recognition process of the notes and symbols. Further, the detected bars in the step (4) are utilized to recognize a plurality of parts which are concurrently performed. The detection and recognition of the notes and symbols can be conducted by a known pattern matching method. The step (11) of erasing the symbols may be eliminated since the MIDI data can be formed according to the recognition results up to the step (10). However, the symbol may be preferably erased for facilitating the data processing.

The above noted conventional score recognition process is designed for a high performance computer to execute complicated digital image processing. Thus, a personal computer could not execute such a complicated digital image processing at a practical speed of operation. In order to realize practical use of the personal computer in the musical score recognition and subsequent automatic performance, previously various attempts have been conducted to simplify data processing schemes. However, the prior art has still the following drawbacks:

First, in case that a simplified pattern recognition method is adopted for discrimination of notes and symbols in view of reduction in a computation amount, inclination of the musical score image generated at sampling operation would hinder accurate determination of the staff line levels and accurate recognition of the notes and chords.

Second, it would be necessary to provisionally erase the staff lines for applying the conventional simplified pattern recognition method to the discrimination of notes and symbols, because the presence of the staff lines would hinder the effective application of the simplified method. However, excessively thorough erase of the detected staff lines might adversely mutilate objects on the staff lines to thereby hinder correct recognition of the notes and symbols.

Third, the simplified pattern recognition method might fail to discriminate between note heads and note beams, because of general similarity therebetween.

Fourth, the use of the conventional simplified pattern recognition method might suffer from serious pattern recognition error in case that the original score image contains distortions, blurs and other noises.

Fifth, the musical score normally contains a chord composed of multiple notes which are concurrently sounded. Further, the multiple notes may have a different time length or duration. Moreover, a rest may be interposed between adjacent notes. Thus, it would be difficult to correctly determine actual note-on and note-off timings according to the recognition results of the notes, rests and other symbols.

SUMMARY OF THE INVENTION

In view of the above noted various drawbacks of the prior art, a general object of the invention is to provide an improved musical score recognition method and apparatus which can efficiently achieve the score recognition with reduced computation while ensuring accurate discrimination of the objects on the score and ensuring exact automatic sounding of musical tones according to the recognition results.

A first specific object of the invention is to realize efficient and accurate compensation for inclination of a sampled score image prior to the object recognition.

A second specific object of the invention is to realize effective and adequate erase of staff lines while avoiding mutilation of components on the staff prior to the object recognition.

A third specific object of the invention is to realize easy elimination of beams prior to note head recognition.

A fourth specific object of the invention is to provide fast and accurate matching process of the score components.

A fifth specific object of the invention is to achieve production of exact performance data based on the musical score recognition.

Generally, the inventive musical score recognition apparatus is constructed for recording an image of a given musical score in the form of a two dimensional array of mark and space dots and for processing the recorded image to thereby recognize various components or objects including staffs, notes and other symbols so as to produce performance information according to the recognized components.

According to the first aspect of the invention, the musical score recognition apparatus includes staff discriminating means for discriminating a staff from the recorded image, inclination detecting means for detecting an inclination of the discriminated staff to calculate an inclination degree, first inclination compensating means for shifting the mark dots to a vertical direction according to the calculated inclination degree so as to compensate the recorded image for the detected inclination with respect to a horizontal axis, second inclination compensating means for shifting the mark dots to a horizontal direction according to the calculated inclination degree so as to compensate the recorded image for the detected inclination with respect to a vertical axis, and position determining means for determining a position of each component based on a compensated image.

According to the second aspect of the invention, the musical score recognition apparatus includes staff position determining means for processing the recorded image to recognize each staff line to thereby determine a position and a thickness of each staff line, block searching means for searching every block of congregated mark dots having a width comparable to the determined thickness of each staff line and extending along the determined position of each staff line in the recorded image, block selecting means for selecting every longitudinal one of the searched blocks having a length greater than a regular dimension of notes and symbols, block erasing means for exclusively erasing all the selected longitudinal blocks to prepare a working image substantially free of the staff lines, and note and symbol position determining means for processing the working image to recognize notes and symbols to determine positions thereof.

According to the third aspect of the invention, the musical score recognition apparatus includes staff erasing means for provisionally erasing recognized staffs from the recorded image to prepare a first working image, range setting means for setting a test range in terms of a width, a length and a tilt, those of which characterize a typical beam extending between adjacent notes, block searching means for scanning the first working image to search every block of congregated mark dots having a width, a length and a tilt, those of which satisfy the set test range, block erasing means for erasing all the searched blocks from the first working image to prepare a second working image substantially free of beams initially contained in the recorded image, and note and symbol position determining means for processing the second image to recognize notes and symbols to determine positions thereof.

According to the fourth aspect of the invention, the musical score recognition apparatus includes reference storing means for storing a reference pattern of each object, which is composed of a discrete arrangement of positive and negative points characteristic to a corresponding object, the positive point being located where the corresponding object should have a mark dot, the negative point being located where the corresponding object should have a space dot, object matching means for effecting matching process of an object extracted from the recorded image with respect to respective one of the reference patterns to calculate a matching degree according to a rate of coincidence between positive and negative points, and mark and space dots such that the coincidence is tested between a given point and a group of dots at and around the given point, and object recognizing means for identifying a particular reference pattern corresponding to the object according to the calculated matching degree to thereby recognize the object.

According to the fifth aspect of the invention, the musical score recognition apparatus includes event determining means for determining a sequence of events according to recognized results of the notes, rests and symbols, the event determining means having means for specifically identifying a plurality of concurrent events which occur at the same time, and duration determining means for determining a duration between a preceding event and a succeeding event according to a time length of a recognized note involved in the preceding event, the duration determining means having means for determining a duration between preceding concurrent events and a succeeding event according to a minimum time length of recognized notes involved in the preceding concurrent events.

With regard to the first aspect of the invention, the recorded image is scanned to extract the staff. Usually, the staff contains an inclination so that the level of each staff line is different between top and end edges thereof. Thus, the inclination would hinder correct detection of note pitches. In view of this, an inclination degree of the extracted staff is calculated, and the originally recorded image is compensated according to the calculated inclination degree. In the inclination compensation, each component contained in the score image is divided into segments. All the mark dots of the component are shifted segment by segment in parallel manner to either of horizontal and vertical directions. Thus, the correction of the score image can be effected by a simple manner in contrast to the prior art in which complicated coordinate conversion computation is required for rotation of the image. Further, the parallel dot shift can be effected independently in either of the horizontal and vertical directions. For example, each inclined line of the staff is divided into longitudinal segments of different levels, and the longitudinal segments are shifted vertically to align along a straight horizontal line. By this, each staff line is corrected such that top and end edges thereof are set at the same level to thereby enable exact pitch detection of notes. Moreover, each component such as note and symbol is divided into segments, and the segments are shifted horizontally to reshape each component. By this, matching error can be eliminated between a component and a corresponding reference pattern for use in later pattern recognition process. Thus, a simplified pattern recognition method can be adopted efficiently, while ensuring the accuracy of the recognition. Moreover, positional error of notes in the horizontal direction can be also eliminated to thereby ensure exact detection of chord notes. Consequently, efficient recognition of the musical score can be realized with a reduced computation work to thereby ensure accurate reading of performance events on the musical score.

With regard to the second aspect of the invention, the sampled score image having the staff is scanned to search every block of congregated mark dots having a width comparable to the recognized thickness of each staff line and extending along the recognized position of each staff line. Further, every longitudinal one of the searched blocks longer than a preset size is selectively erased to thereby exclusively delete the staffs from the recorded image, while reserving other components such as notes and symbols. The erase of the staff can efficiently limit an area to be subjected to later pattern matching process. Further, the selective and restricted erase of the staff can avoid the remaining notes and symbols from inadvertent mutilation and deformation. Thus, efficient recognition of the musical score can be realized with a reduced volume of computation to thereby ensure accurate and quick determination of performance events written on the score.

With regard to the third aspect of the invention, the score image after erase of the staffs is further scanned to search every block composed of congregated mark dots having a width, a length and a tilt, those of which fall within respective test ranges set after a typical beam extending between adjacent notes. Then all the searched blocks are erased to prepare a working image free of beams besides staffs. By the removal of the beams and staffs, the remaining notes and symbols are reserved in isolated or discrete manner, thereby effectively limiting an area to be subjected to later pattern matching process. Further, the matching process is applied to the score image free of the beams to thereby avoid confusion between true objects of notes and false objects of beams. Consequently, efficient recognition of the musical score can be realized with a reduced volume of computation to thereby ensure exact and quick determination of performance events written on the given musical score.

With regard to the fourth aspect of the invention, the matching process utilizes a simplified reference pattern composed of a discrete arrangement of positive and negative points which are characteristic to a corresponding object. The matching degree is calculated according to a rate of coincidence between positive points of the reference and mark dots of the object, as well as between negative points and space dots. Each coincidence is tested between one point and plural dots including not only a central dot but also peripheral dots. Thus, the object recognition can be carried out accurately and flexibly even though the score image contains moderate deformation, blur and noise. Consequently, the musical score can be efficiently recognized with a reduced computation work to thereby ensure quick and accurate determination of performance events written on the musical score. Further, the reference pattern may be designed such that any positive point is arranged to avoid inadvertent coincidence to a piece of staff lines, which may be involved in the object as remainings of the selective and restricted erase of the staff lines. By this, the matching degree is not affected by the left piece of staff lines to thereby ensure correct object recognition.

With regard to the fifth aspect of the invention, during the course of determining a sequence of performance events according to the recognized results of notes and symbols, a plurality of concurrent events are particularly identified, which occur at the same time. Further, a duration of sound timings is determined between preceding concurrent events and a succeeding event according to a minimum time length of recognized notes involved in the preceding concurrent events. Consequently, an exact duration can be determined by simplified processing of the recognized notes. Moreover, if a rest event is occasionally interposed between a preceding note event and a succeeding note event, a time length of a recognized rest symbol is simply added to a time length of the preceding note to thereby consistently determine the duration between preceding and succeeding note-on timings.

BRIEF DESCRIPTION OF THE DRAWINGS

FIGS. 18A, 18B, 18C, 18D, 18E and 18F show various reference patterns.

FIG. 21 is a diagram showing a method of discriminating a chord in the FIG. 20 process.

FIGS. 22A and 22B are diagrams showing methods of detecting a stem end and a note dot.

FIG. 23 is a diagram showing a method of counting beams or hooks in the FIG. 20 process.

EMBODIMENTS

Figure 1:
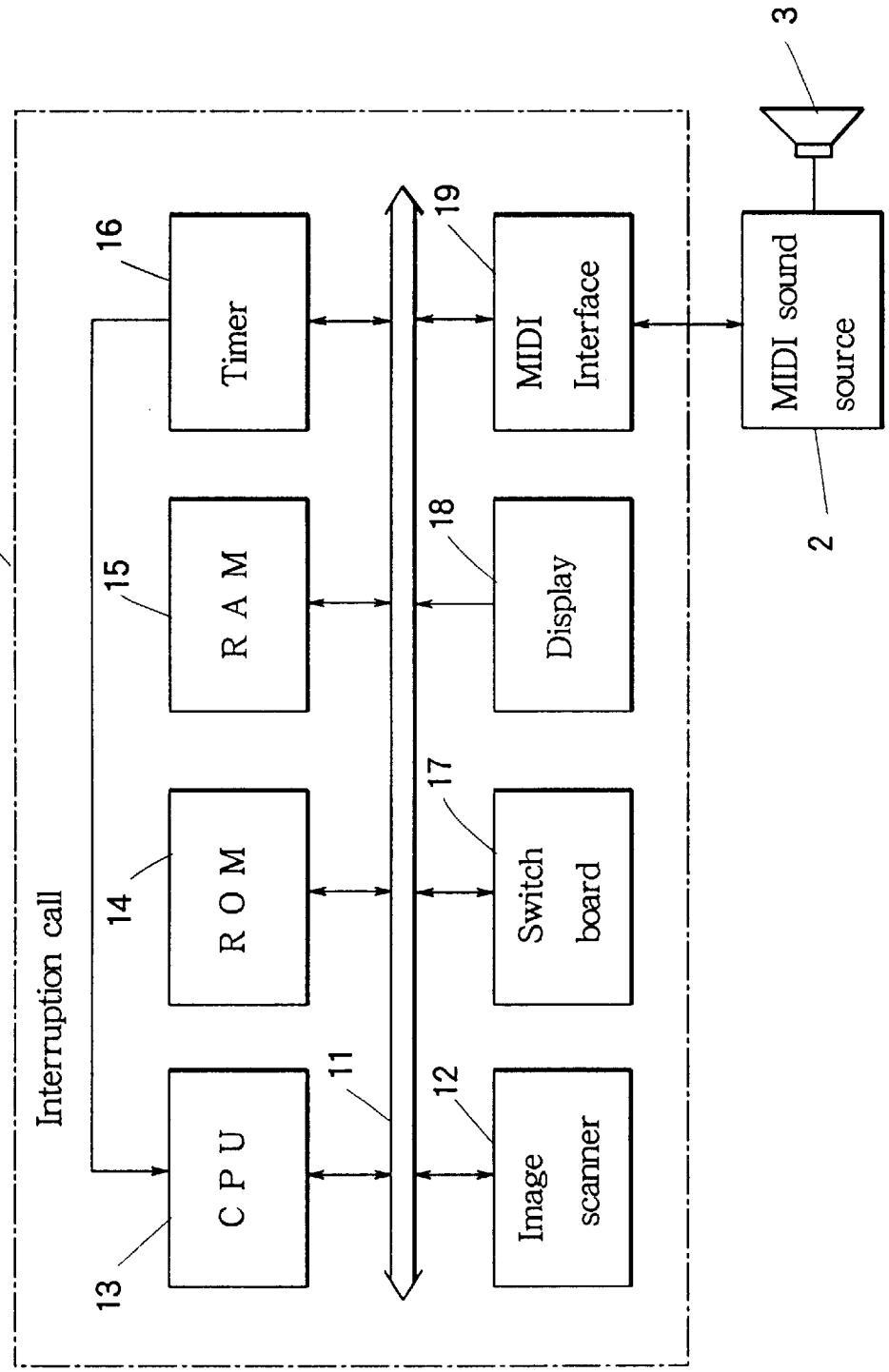
FIG. 1 is a block diagram showing a musical staff recognition and automatic performance system according to the invention.

Hereinafter, preferred embodiments of the invention will be described in conjunction with the drawings. FIG. 1 is a block diagram showing an overall structure of an automatic score recognition and performance system according to the invention. The system is comprised of a musical score recognition apparatus 1, an external MIDI sound source 2 and an output unit 3. The musical score recognition apparatus 1 is constructed to read a given printed musical score text to recognize various components of the musical score and their position, such as staff, note and other symbols. The apparatus 1 produces performance data containing tone pitch, tone timing and tone duration based on the score recognition results. Moreover, the apparatus outputs MIDI data according to the performance data. On the other hand, the MIDI sound source 2 is composed of, for example, an electronic musical instrument which automatically undergoes a musical performance according to the MIDI data fed from the musical score recognition apparatus 1. The output unit 3 is composed of a speaker or other audio devices, which is driven by the MIDI sound source 2.

The musical score recognition apparatus 1 is comprised of a computer system such as a personal computer or a work station, which includes various units interconnected through a system bus line 11, such as image scanner 12, CPU 13, ROM 14, RAM 15, timer 16, switch board 17, display 18 and MIDI interface 19. The image scanner 12 constitutes an image input device for optically reading a given musical score text to record a binarized image thereof composed of a two dimensional array of mark and space dots. The CPU 13 executes score recognition process according to a given program stored in the ROM 14. The RAM 15 contains a frame memory area for memorizing the binarized image sampled by the image scanner 12, and provides a working area for use in execution of the score recognition process. The timer 16 regulates an output timing of the MIDI data based on performance data obtained as a result of the score recognition process. For this, the timer 16 calls an interruption process in the CPU 13 for output operation of the MIDI data. The switch board 17 and the display 18 constitute the man/machine interface between the score recognition apparatus 1 and an operator. The score recognition apparatus 1 feeds the produced MIDI data to the external MIDI sound source 2 through the MIDI interface 19.

Figure 2:
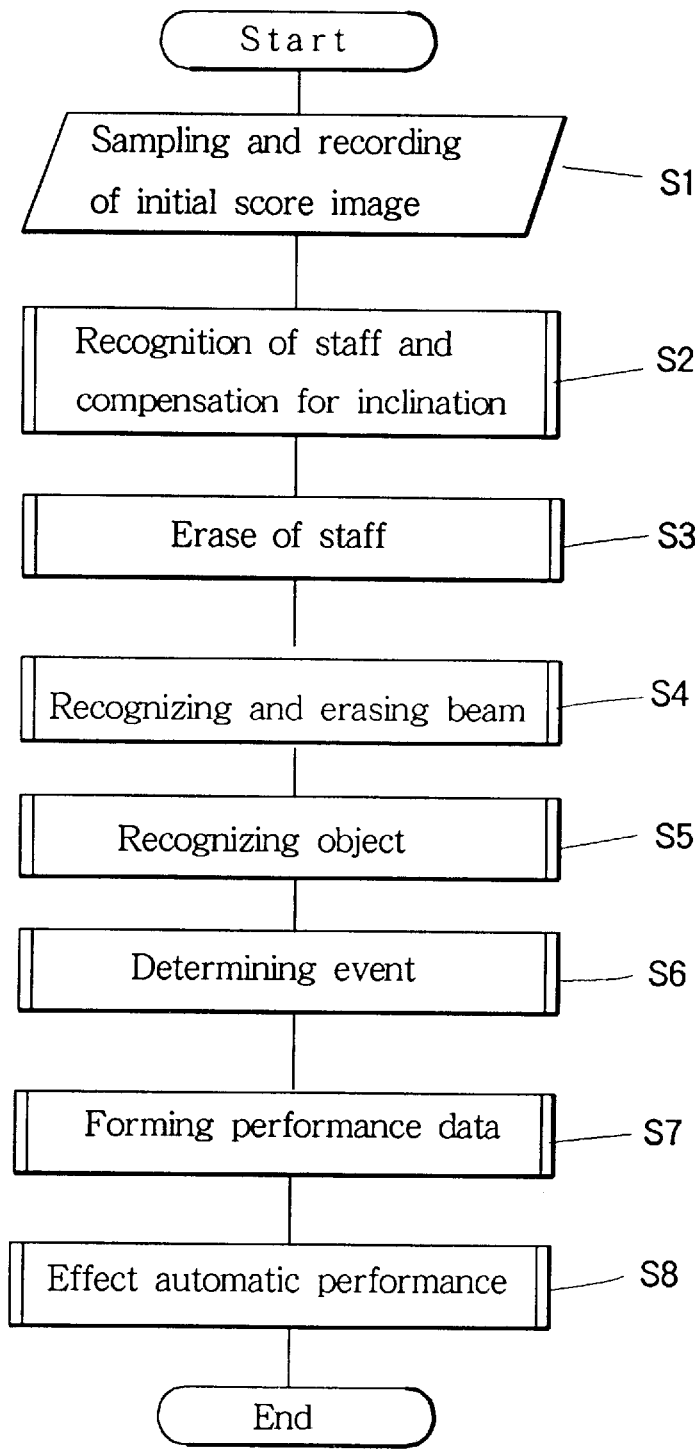
FIG. 2 is a flowchart showing overall process of the musical staff recognition and automatic performance.

Next, the description is given for operation of the thus constructed automatic score recognition and performance system. FIG. 2 is a flowchart showing the overall process of musical score recognition and subsequent automatic performance, which are basically divided into four sections as follows:

(1) Provisional process including recognition of staffs and bars, incline compensation, and erase of staffs and beams.

(2) Object recognition process including determination of circumscribed rectangle of an object and matching with a reference pattern.

(3) Event recognition process including determination of tone pitch and tone length, and production of performance data.

(4) Automatic performance process including transformation of performance data into MIDI data and output thereof.

Figure 3:
FIG. 3 is a diagram showing an example of a musical score text to be recognized.
Figure 4:
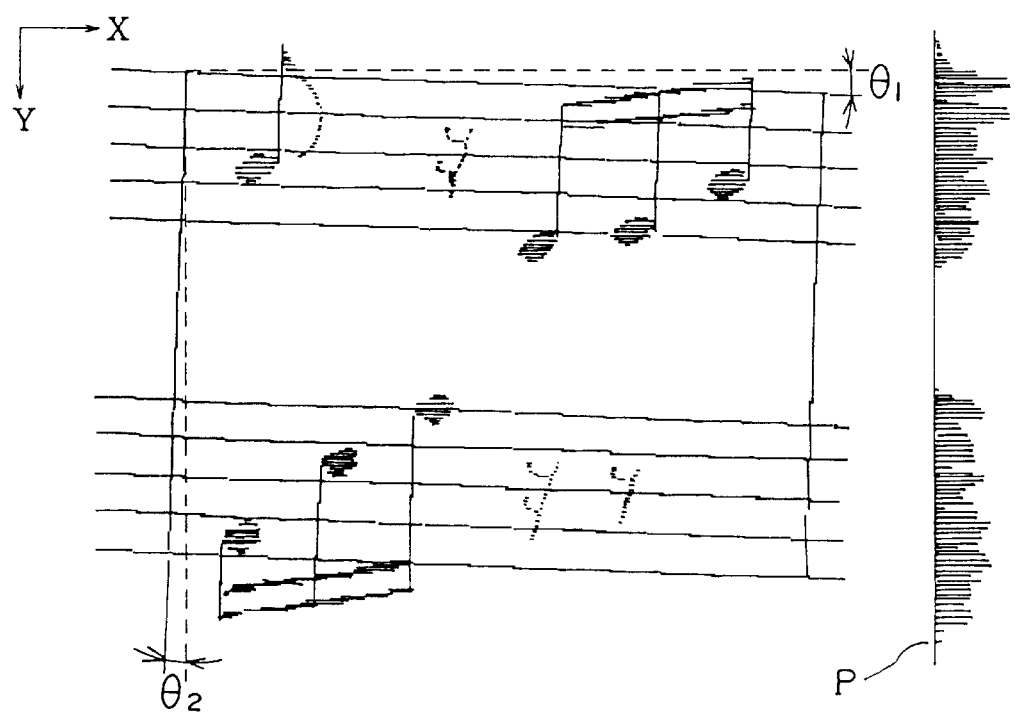
FIG. 4 is a diagram showing a recorded image taken from the musical score text, and its projection.

First, Step S1 is undertaken to sample and read a given musical score text by the image scanner 12 to thereby record an initial image of the musical score text in the RAM 15. When the musical score text (FIG. 3) is read by the image scanner 12, occasionally the initial image of the musical score text may be taken and recorded in an inclined state relative to an X-axis (horizontal axis) and a Y-axis (vertical axis). In such a case, as shown in FIG. 4, the initial image is recorded on the frame memory in an inclined format relative to the X-axis and Y-axis. Such an inclination of the recorded image may seriously affect recognition process. Namely, with regard to the inclination θ1 relative to the X-axis, even a slight incline may broaden a vertical profile of a projection P (which is taken along the Y-axis in terms of piles of mark dots) because of a rather extended length of the staff lines, thereby hindering detection of the staff position. With regard to the other inclination θ2 relative to the Y-axis, this may hinder matching process in the recognition of various objects such as notes, and may hinder true recognition of chord notes which should be sounded concurrently.

Figure 5:
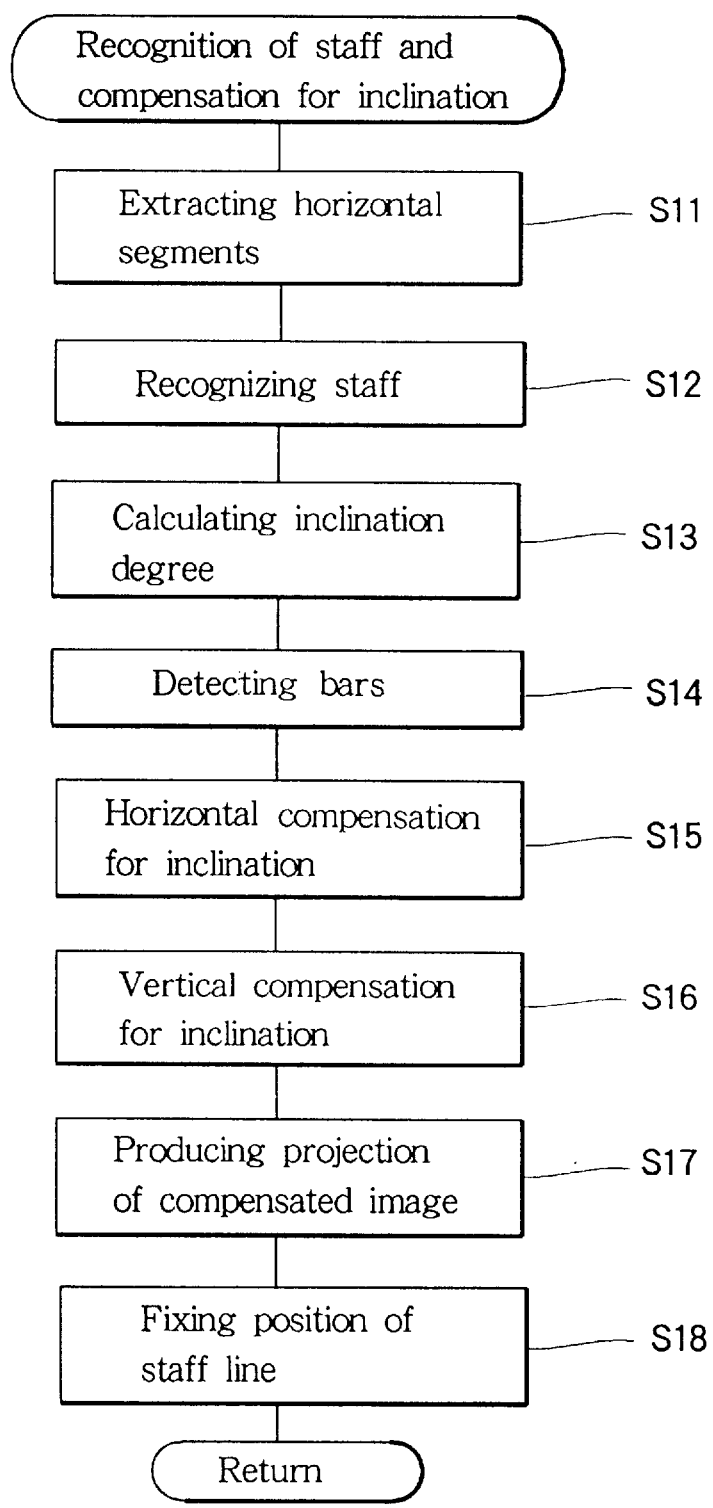
FIG. 5 is a flowchart showing staff recognition and incline compensation process.
Figure 6:
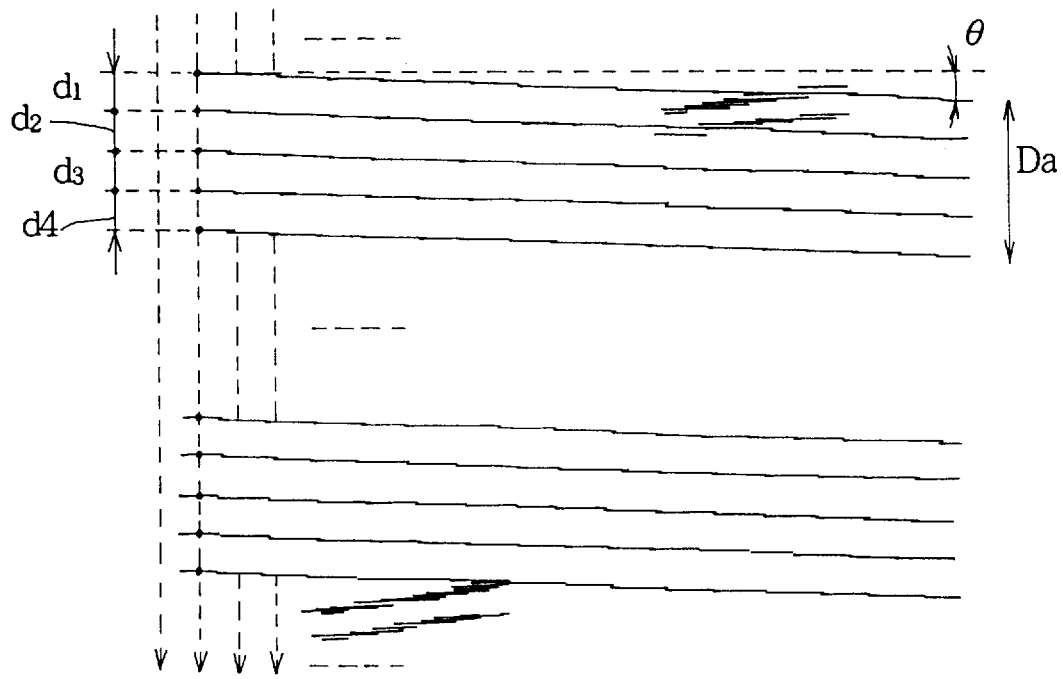
FIG. 6 is a diagram showing an image composed of horizontal components extracted in the FIG. 5 process.

In view of the above, Step S2 is undertaken as a first procedure of the provisional process in order to compensate for such an inclination relative to the X-axis and Y-axis. FIG. 5 is a flowchart showing a detail of the staff incline compensation procedure. First, Substep S11 is undertaken to extract from the recorded initial image every horizontal segment having a certain length, i.e., a row segment composed of definite number of mark dots aligned continuously in a row of the horizontal direction (X-axis direction), so as to exclude the remaining components such as notes and symbols, which would hinder recognition of the staff. In order to efficiently discriminate from the objects, the length of the horizontal segment, i.e., the mark dot number of the row segment, should be set sufficiently greater than a general horizontal size of the object. FIG. 6 shows a working image of the musical score obtained after extracting the row segments from the initial image. The extracted image may contain other line components such as a note beam, than the staff, but almost all of the solid objects are removed so that the extracted staff image does not contain substantial noise.

Next, Substep S12 is undertaken to recognize the staff on the resulting image composed of row segments. Namely, as shown in FIG. 6, the horizontal line image is scanned vertically in the Y-axis direction along a left edge of the image so as to detect five consecutive horizontal lines arranged at a constant interval. In detail, the vertical scanning may detect five row segments arranged sequentially at intervals of d1, d2, d3 and d4 which are measured by numbers of space dots between adjacent row segments, as shown in FIG. 6. Then, the mean interval Dm is calculated according to the following formula.

$$Dm = (d1 + d2 + d3 + d4)/4$$

Further, check is made as to if the intervals d1–d4 satisfy the following relation.

$$Ds = |Dm-d1| + |Dm-d2| + |Dm-d3| + |Dm-d4| < 3 \text{ dots}$$

where Ds denotes a total deviation of the four intervals from the mean interval Dm. In case that the relation "Ds<3 dots" is satisfied, it is judged that the five detected row segments belong to the five lines of the staff. In this operation, vertical positions of the five lines of the staff are determined by respective mark dots (black dots) existing at intersections between the five row segments and the vertical scanning line. The Y-axis coordinates of the five black dots are registered in the RAM 15 together with a staff width Da measured from the top to bottom of the five lines. In case that the image scanner 12 has a resolution in the order of 360 dpi, each staff line may have a thickness of 5 to 6 dots. In such a case, a center Y-axis coordinate of each staff line is memorized.

Subsequently, as shown in FIG. 6, Substep S13 is undertaken to repeatedly execute the vertical scanning while shifting stepwise the scanning section in the horizontal direction so as to calculate an inclination degree θ of the staff according to the following formula.

$$\theta = \tan^{-1}(y/x)$$

where the denominator x denotes a number of dots contained in one section along the X-axis and the numerator y denotes a differential number of dots within one section along the Y-axis. In this operation, once the top and bottom positions of the staff is determined, the intermediate width Da may be skipped from the vertical scanning in order to achieve fast processing, as shown by FIG. 6. Further, the vertical scanning may not be undertaken throughout the entire length in the X-axis direction, but may be carried out to cover one third of the entire horizontal length so as to calculate the inclination, thereby achieving faster processing.

Next, Substep S14 is undertaken to sequentially scan the initial image in the X-axis direction to detect every bar extending along the Y-axis direction, in manner similar to the detection of the staff. For example, a piano score is normally composed of a pair of staffs coupled by common bars in order to perform concurrently a high octave part marked by G clef and a low octave part marked by F clef. In such a case, a vertical line having a length greater than three times of the staff width Da should be recognized as a bar. Such a specific condition may be provisionally inputted by the switch board 17 according to a type of the given musical score text. The detected bar is registered in the RAM 15 in terms of its X-axis coordinate (horizontal position) and its vertical span. The positional information of the bars can be utilized to check the beat within each measure during the course of consecutive note length determination. The span information of the bar can be utilized to determine a set of parts which should be performed in parallel manner.

Figure 7A:
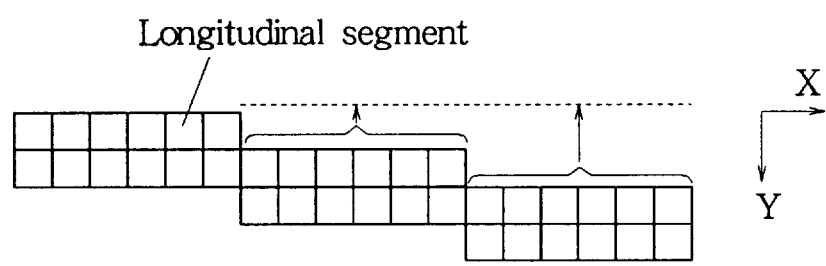
FIGS. 7A and 7B show a diagram showing incline compensation in the FIG. 5 process.

Then, Substeps S15 and S16 are undertaken to compensate the initial image for the inclination of the staff. The incline compensation is carried out separately in Substep S15 of horizontal incline compensation process, and in Substep S16 of vertical incline compensation process. In Step S15 of the horizontal incline compensation process, as shown in FIG. 7A, each longitudinal segment of mark dots is searched in and around the staff lines over an area of the original image, containing effective information related to performance. Then, each longitudinal segment is shifted vertically dot by dot according to the previously calculated inclination degree $\theta$ so as to align straight along a horizontal line to thereby horizontally correct for the inclination. The shift of the segments is carried out locally and independently in and around the respective staff lines, because the five staff lines may have different inclinations in some form of the score text.

Figure 7B:
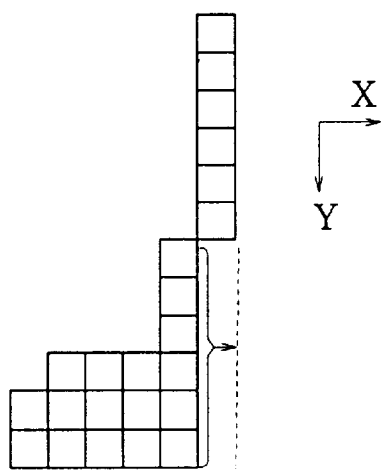

In similar manner, the vertical incline compensation is conducted in Substep S16 such that, as shown in FIG. 7B, each segment of mark dots continuous in the Y-axis direction is shifted in the X-axis direction dot by dot according to the calculated inclination degree $\theta$ to thereby correct deviation from the Y-axis. Preferably, the vertical incline compensation may be effected only when the inclination degree $\theta$ exceeds a certain critical angle. This critical angle should be set in view of the resolution of the image scanner such that an allowable inclination within the critical angle may not affect the object recognition and the chord detection. This critical angle may be varied according to the bar length. By such operation, in case that the inclination is not so large as to affect the component recognition, the vertical compensation can be omitted to save the processing time.

Figure 8:
FIG. 8 is a diagram showing a score image after the vertical inclination correction.
Figure 9:
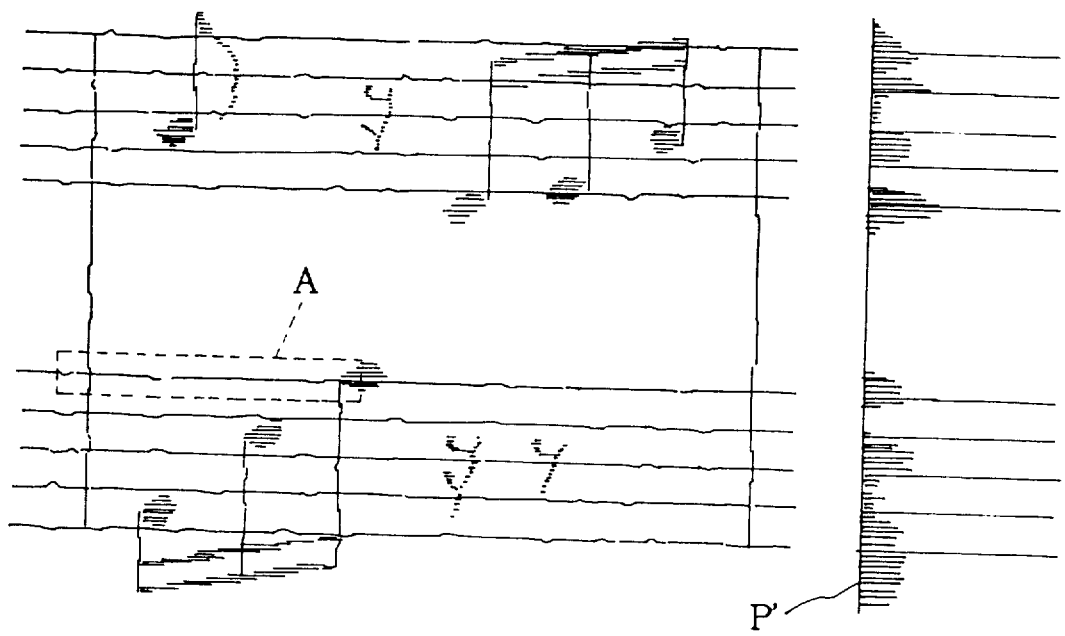
FIG. 9 is a diagram showing a score image and a projection thereof after the horizontal inclination correction.

FIG. 8 shows an exemplified score image after the vertical incline compensation. FIG. 9 shows another exemplified score image after the horizontal incline compensation. As shown in this figure, a projection profile P' of the corrected score image taken in the direction of the X-axis has a sharp peak at each of the staff line levels. Therefore, Substep S17 is undertaken to obtain the projection P' of the corrected image along the Y-axis. Then, Substep S18 is undertaken to calculate a center Y-axis coordinate of each peak contained in the projection. The calculated Y-axis coordinate is memorized as a fixed position of each staff line. At the same time, each interval D between adjacent staff lines is fixed. Alternatively, in place of producing the projection, the corrected image may be scanned vertically across the staff to sample a set of Y-axis coordinates so as to satisfy the condition "Ds<3 dots". The thus obtained Y-axis coordinates are fixed as final positions of five staff lines. Further, since the FIG. 9 image is compensated also vertically for the inclination, another projection along the X-axis may be produced for use in checking of horizontal positions of objects during the recognition thereof, which will be described later.

Figure 10:
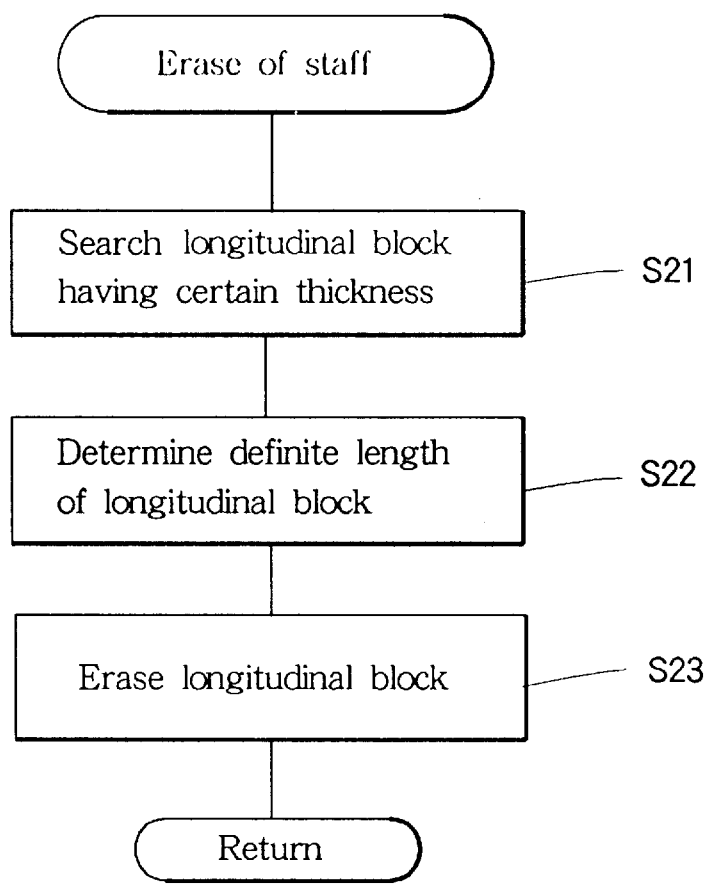
FIG. 10 is a flowchart showing staff erasing process.
Figure 11:
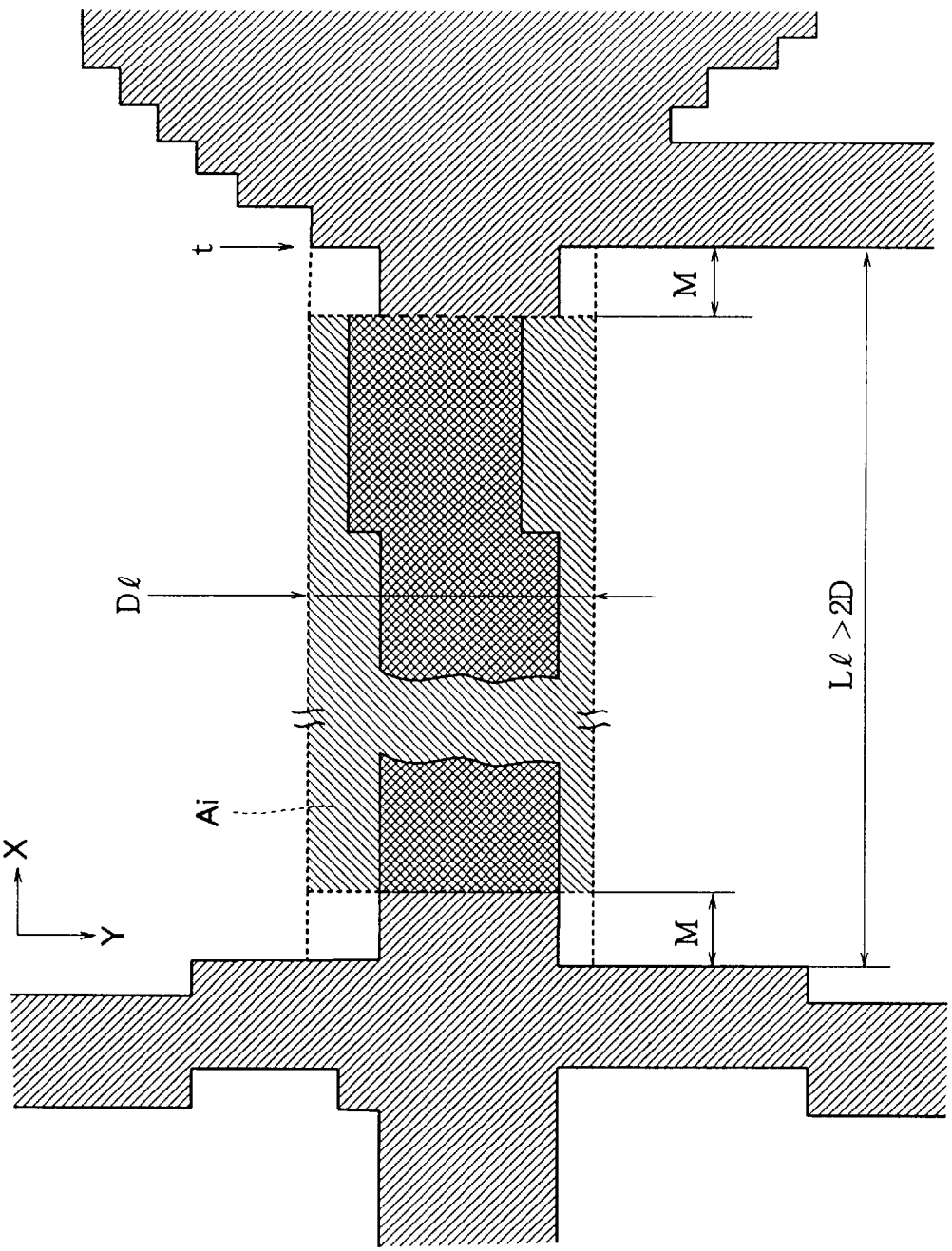
FIG. 11 is a diagram showing a method of discriminating width and length of a longitudinal block in the FIG. 10 process.
Figure 12:
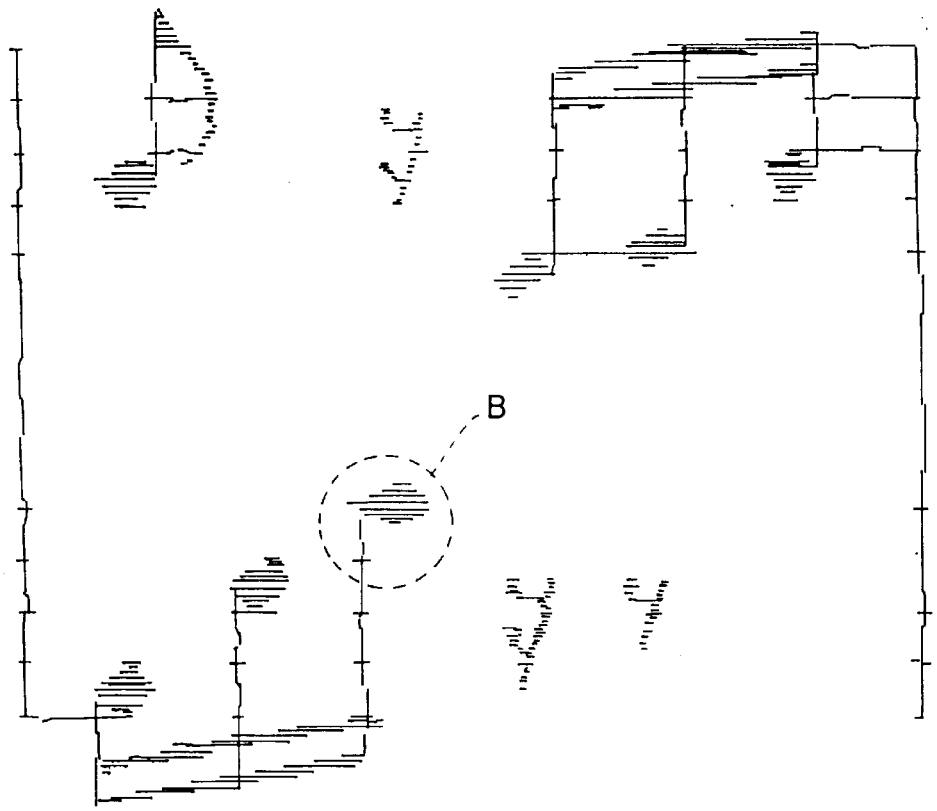
FIG. 12 is a diagram showing a score image after erase of the staff.
Figure 13A:
FIG. 13A is a diagram showing a note processed by the prior art.
Figure 13B:
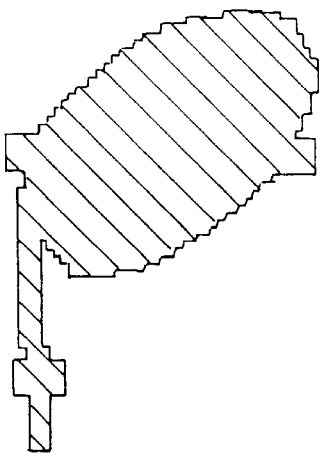
FIG. 13B is a diagram showing an enlarged view of a note contained in the FIG. 12 image.

After finishing Step S2 of recognizing and correcting the staff, next Step S3 is undertaken to erase exclusively the staff from the corrected image of the given score text. The erase of the staff in Step S3 aims to ensure accurate recognition of the objects. The erase of the staff must be conducted exclusively in order to avoid the objects from breaking or mutilation as illustrated in FIG. 13A. The detail of the staff erase process will be described in conjunction with a flow-chart of FIG. 10. First, Substep S21 is undertaken to search every longitudinal block of congregated mark dots having a width comparable to a mean thickness of the staff line and extending along the recognized staff line. Then, Substep S22 is undertaken to check the extent of the block along the horizontal direction, and to determine a definite length of the block when the width of the block no longer satisfies the mean thickness of the staff line. Then, Substep S23 is undertaken to erase every longitudinal block provided that its definite length exceeds twice as much as the staff interval D. For example, referring to FIG. 11 which is an enlarged view of an area A indicated in the FIG. 9 score image, the staff line has a mean thickness of five to six consecutive dots. Thus, a horizontal zone Ai having a width D1 of about 8 dots is searched to cover the staff line. The width of the longitudinal block located within the zone Ai is checked continuously in the X-axis direction. When the width of the block falls outside the given thickness condition at a timing t, the check is made as to if the length Lk of the block meets the test condition Ll>2D. In case that the test condition is satisfied, the block is erased from the zone Ai while leaving a certain margin M at opposite ends thereof. By such an operation, as shown in FIG. 12, most of each the staff lines is eliminated. FIG. 13B shows an enlarged view of an area B containing a note head indicated in FIG. 12. The note head can be maintained as it is, while the slight remainings of the erased staff line are observed opposite sides of the note head. In contrast, as shown in FIG. 13A, erasing the entire staff line would deform the perfect shape of the object since the erased zone mutilates the note head. In this operation, the mean thickness of the staff line is calculated according to the results of the preceding staff recognition process for providing the test condition of the staff erase. Alternatively, the mean thickness may be provisionally registered by measuring an actual staff line thickness relative to a staff interval in a typical musical score text.

Figure 14A:
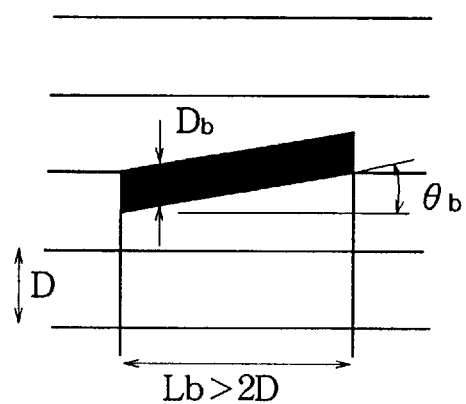
FIGS. 14A and 14B are a diagram showing a manner by which a beam is recognized and erased.
Figure 14B:
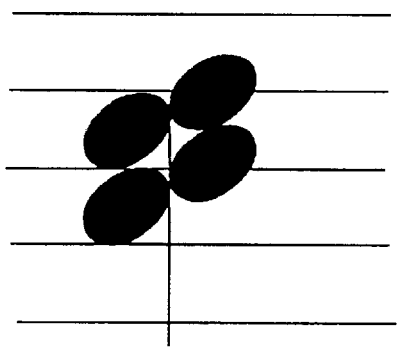

After finishing Step S3 of erasing the staff, subsequent Step S4 is carried out for recognizing and erasing beams of notes. Like the staff line, the beam may be confused with a group of chord note heads as shown in FIG. 14B during the object recognition. Therefore, the beam is also temporarily erased from the score image until the determination of note length. However, the beam has diverse forms including variations which are different from a typical pattern, and it would be impractical to completely recognize all of the variations. Therefore, at a minimum, beams having a typical pattern will be recognized and erased for facilitating the later processing. Maintaining the unerased exceptional variations of the beams is much better than the inadvertent erase of objects due to erroneous recognition of confusing beams. As shown in FIG. 14A, a typical pattern of the beam is defined in terms of test ranges of thickness Db, length Lb and tilt angle $\theta$b according to the following conditional relations.

Thickness: D/3<Db<D

Length: Lb≧2D

Tilt angle: −45°≦θb≦45°

Figure 15:
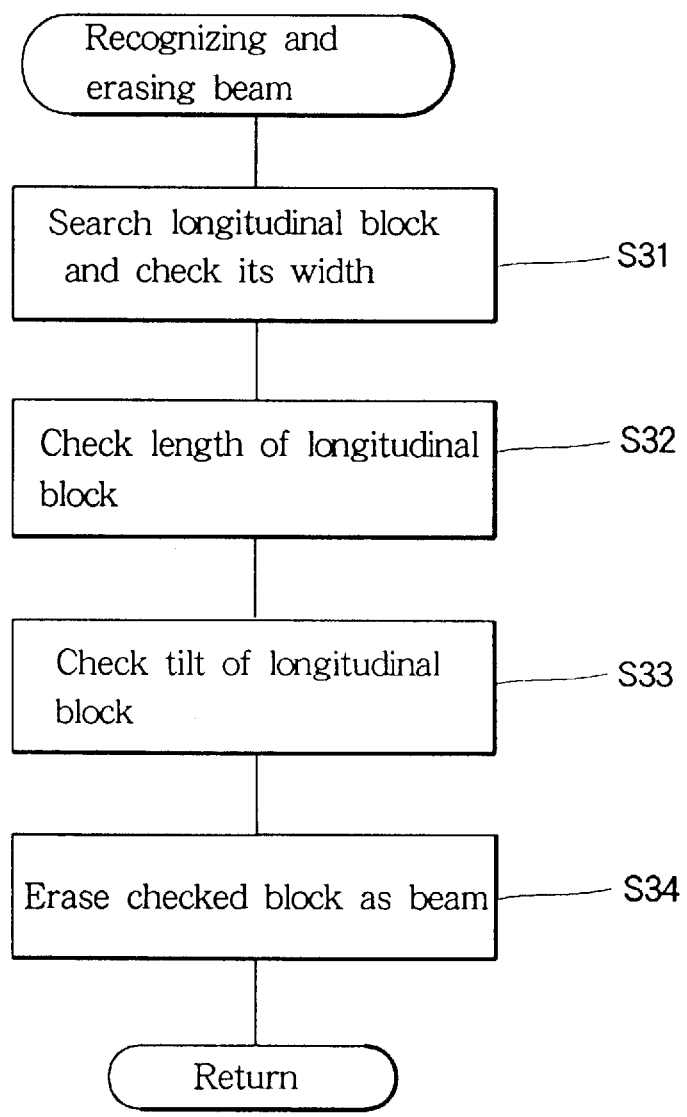
FIG. 15 is a flowchart showing beam recognition and erase process.

FIG. 15 is a flowchart showing the detailed process of beam recognition and erase. First, Substep S31 is undertaken to discriminate a longitudinal block of congregated mark dots having a thickness satisfying the first test condition D/3<Db<D, in the score image from which the staff is clearly erased. Then, Substep S32 is undertaken to check as to if a length of the same block satisfies the second test condition Lb>2D. Further, Substep S33 is undertaken to check as to if the same block satisfies the third test condition −45°≦θb≦45°. Lastly, Substep S34 is carried out to erase every discriminated block provided that the same meets all of the test conditions.

Figure 16:
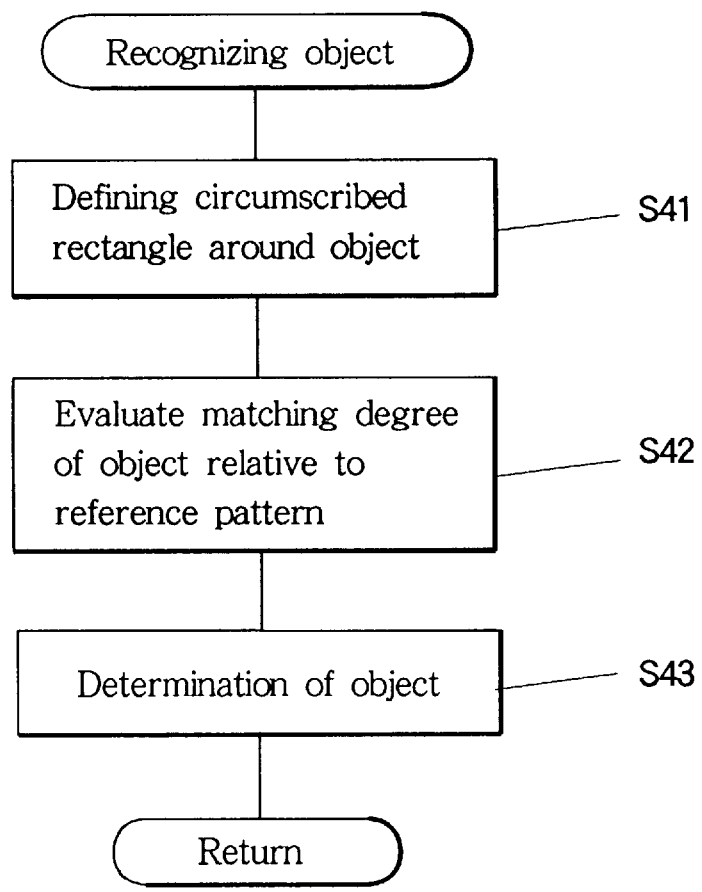
FIG. 16 is a flowchart showing object recognition process.
Figure 17:
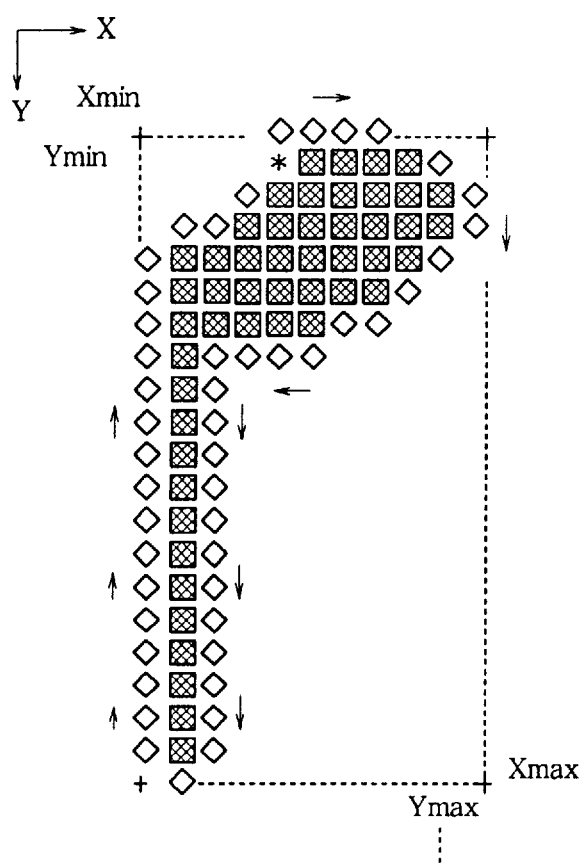
FIG. 17 is a diagram showing a method of determining a circumscribed rectangle on an object in the FIG. 16 process.

After finishing the beam recognition and erase process, Step S5 is carried out for object recognition. The object recognition process will be described in detail with reference to a flowchart of FIG. 16. First, Substep S41 is undertaken such that the score image free of the staff lines and beams is scanned to search scattered and solid blocks of congregated mark dots to sample objects, and then a circumscribed rectangle is defined for each of the searched objects. The circumscribed rectangle is set to limit an area to which matching process is applied, thereby avoiding tedious operation of applying matching process to the whole area of the score image. For example, as shown in FIG. 17, after removal of the staff lines and beams, the score image is lasterscanned dot by dot so as to cross a block of congregated mark dots. When hitting one dot marked "*" belonging to a block, a contour of the block (marked by "◊" in the figure) is traced from the start dot * in clockwise direction as indicated by the arrows to thereby determine maximum and minimum coordinate values $X_{max}$, $Y_{max}$, $X_{min}$ and $Y_{min}$ of the X-axis and Y-axis according to positions of uppermost, lowermost, leftmost and rightmost dots contained in the traced contour. Thus, a rectangle is defined by the coordinate values $X_{max}$, $Y_{max}$, $X_{min}$ and $Y_{min}$ to circumscribe the block of dots. In extracting the contour, check is made as to if each dot has adjacent upper, lower, left and right dots, one by one from the start dot *. If an addressed dot has four adjacent dots, the addressed one is determined to an internal dot and is therefore temporarily erased. The same check is repeatedly carried out in chain mode until all of the internal dots are erased to thereby reserve exclusively external dots which define the contour. In this operation, a copy of the score image free of the staff lines and beams is stored in a separate area of the frame memory for use in later reproduction of the score image after completion of the setting of circumscribed rectangles for all of the blocks. Alternatively, the temporarily erased internal dots may be registered for the later reproduction of the complete image.

Next, Substep S42 is undertaken to scan each circumscribed rectangle using a given reference pattern to evaluate matching degree. As shown in FIGS. 18A–18E, Substep S42 utilizes a specific reference pattern as a matching template, which is composed of a discrete arrangement of characteristic points which represent distinctive portions of an individual object. Namely, the characteristic points include a positive point (marked by black spot in the figure) which indicates a spot where an exact object should have a mark dot, and a negative point (marked by white spot in the figure) where an exact object should have a space dot. Such a specific reference pattern is provisionally stored in the ROM 14 for every kinds of the objects. FIGS. 18A, 18B, 18C, 18D and 18E show various reference patterns corresponding, respectively, to a sharp, a natural, a whole note, a half note and a quarter note. Though the sharp sign resembles closely to the natural sign as a whole, the former has a top right protrusion and a bottom left leg while the latter misses those protrusion and leg. Thus, in order to discriminate the sharp and the natural from each other, the sharp reference pattern (FIG. 18A) contains positive points within contour of the top right protrusion and the bottom left leg, while the natural reference pattern (FIG. 18B) contains negative points within the corresponding zone. Further, the whole note (FIG. 18C) and the half note (FIG. 18D) resemble closely with each other as a whole. However, their internal elliptical shapes are distinctive from each other since these elliptical shapes tilt oppositely to each other. In order to extract these distinctive characteristics, several negative points are suitably located within the internal elliptical openings in a different manner. Further, the characteristic points are located away from a certain area where the before-described unerased margin of the staff lines may stay, in order to avoid erroneous matching operation. Moreover, as shown in FIG. 18F, the sharp sign may be positioned on the staff in offset manner by a half pitch. In such a case, the staff lines may not be erased incidentally over the sharp mark. Thus, the characteristic points are precluded from such an uncertain area where a piece of the staff may remain.

Figure 19:
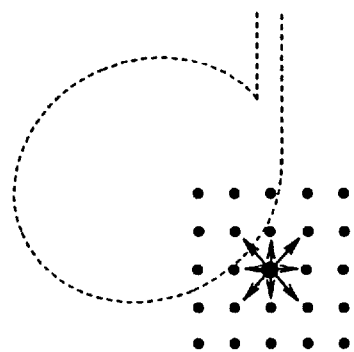
FIG. 19 is a diagram showing matching evaluation in the FIG. 16 process.

The reference pattern is retrieved from the ROM 14, and is then reduced or enlarged according to the interval of the staff lines for the matching process. By such adjustment, the reference pattern can be well adapted no matter how the musical score image is taken by various resolutions. Further, in case that a training musical score for children may contain an unusual size of the objects, the reference pattern can be suitably adjusted according to the size. Then, the circumscribed rectangle is scanned with using the reference pattern adjusted to the size of the object, such as to check whether the object has a correct mark dot at each of the positive characteristic points and has a correct space dot at each of the negative characteristic points. If coincidence is held between the dot and the point, a value "+1" is given for that point. On the other hand that the coincidence is not held, adjacent and surrounding eight dots are further examined as shown in FIG. 19 around the characteristic point. If a mark dot is found around the positive point or a space dot is found around the negative point in this extended matching operation, a value "+0.9" is given to that point. Such an extensive matching can well adapt the rigid reference pattern to reasonable variation of the object shape. Lastly, Substep S43 is undertaken to judge as to if the object corresponds to the tested reference pattern according to the matching evaluation. Namely, if the total value of all the characteristic points exceeds 95% of that obtained in the perfect matching, the sampled reference pattern is judged to correspond to the object. For example, in case that the tested reference pattern is composed of a discrete arrangement of eight characteristic points and that the total value exceeds 8×0.95=7.6, the object is judged to match with the tested reference pattern. In practice, Substep S43 of the object determination and Substep S42 of the matching evaluation are linked together such that an already recognized object is erased from a working image. Further, if a very poor matching value is expected for one reference pattern during the course of the matching evaluation, said one reference pattern is changed in the middle of the processing to a next reference pattern. Such a skillful procedure may efficiently save the process time loss. It should be noted that the present matching method using the discrete reference pattern cannot be applied to recognition of extremely simple objects such as a note-dot and a whole rest. These exceptional objects can be recognized by separate methods according to their geometric characteristics. For example, the whole rest is identified as a specific figure having an adequate area expected according to the interval dimension of the given staff and being composed of closely congregated mark dots. The note-dot is identified during the course of later event-determination process as an extremely small spot where a variance of mark dots is relatively low. It should be noted that a center position of each reference pattern is also stored so that, at the recognition of the object by the corresponding reference pattern, the center position thereof is also calculated in terms of the X and Y coordinates on the score image. The calculated center coordinates are registered in the RAM 15 to indicate the position of the object on the staff.

Figure 20:
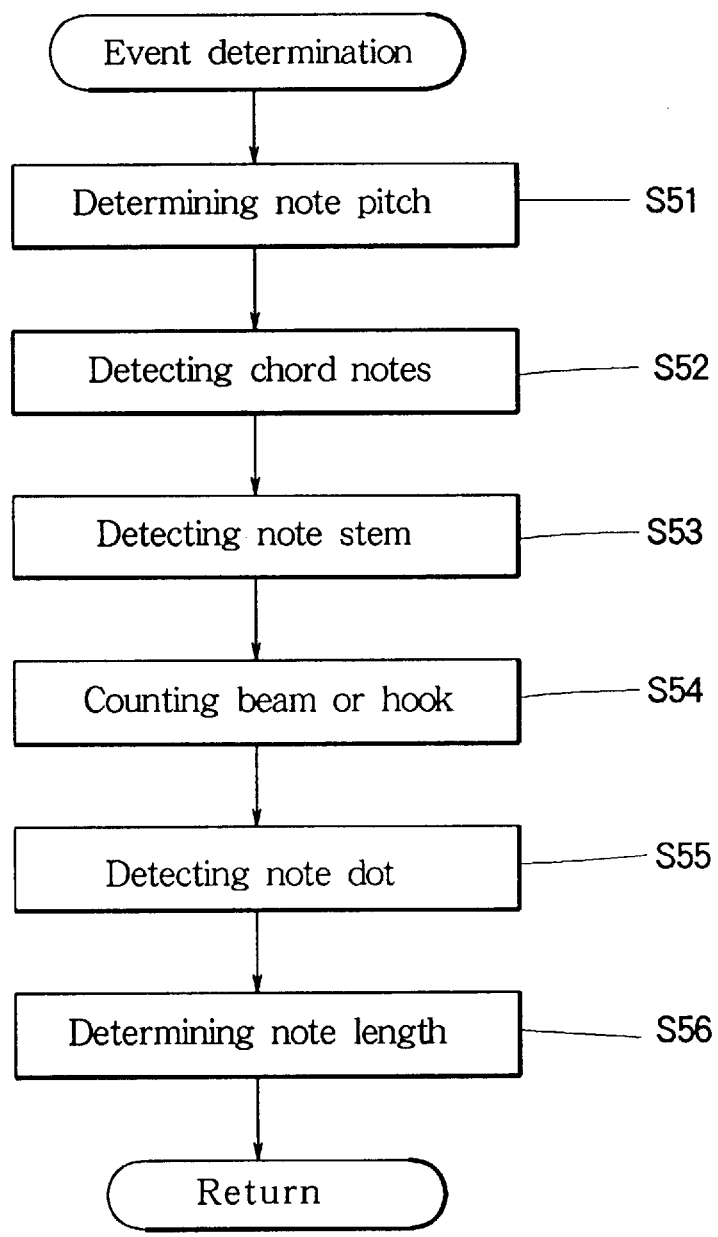
FIG. 20 is a flowchart showing event determination process.

After finishing Step S5 of the object recognition process, subsequent Step S6 is carried out for event determination process. FIG. 20 is a flowchart showing a detail of the event determination process. First, Substep S51 is undertaken to determine a pitch of each note according to the staff information obtained by the staff recognition process and the note coordinates information obtained by the object recognition process. In this Substep S51, the score image is investigated along the staff to sort in time-sequence manner note heads and accidentals such as sharp, flat and natural, which are recognized by the previous Substep S43. The sorted note heads are sequentially placed on the staff according to their coordinates value to determine their pitches while referring to the accompanied accidentals if any and referring to the bar if needed. In determination of the note pitch in Substep S51, a pitch of notes existing outside the five lines of the staff is determined with reference to extra supplementary lines. Theoretically, the supplementary lines might be set at an interval identical to the mean interval D of the staff line. However, in an actual musical score format, the interval of the supplementary lines is often expanded greater than the interval of the staff five lines. In view of this, the note pitch is determined outside the width of the staff with reference to the supplementary lines having an expanded interval by the rate of 1.2 times as much as the regular interval D of the staff lines.

Next, Substep S52 is undertaken for detecting chord notes to be sounded concurrently by investigating positional relationship among closely adjacent note heads according to their center coordinates obtained by the object recognition of Substep S43. In this connection, the chord has various forms h1, h2 and h3 as shown in FIG. 21. With regard to the second form h2, one note is horizontally dislocated from another note which is concurrently sounded, by a close distance Dh measured in terms of the X-coordinate between their note head center positions. In view of this, a group of notes are regarded as a chord provided that the horizontal distance Dh between adjacent notes is not more than the staff line interval D. Further, a distance between adjacent note stems may be evaluated to achieve more accurately the determination of the chord.

Next, Substep S53 is undertaken to determine a tip end position of a note stem connected to each note head, if any. This process is needed to fix a start point from which associated beams or hooks are searched and counted. Namely, in this Substep S53 as shown in FIGS. 22A, a whole shape of an individual note is examined to extract a pair of extreme points which are positioned rightwise uppermost and leftwise lowermost, respectively. Then, check is made as to which of the two extreme points is more remote from the note center marked by "*" to determine the stem end marked by "Δ". In order to avoid erroneous determination due to deformation of the note shape, the search of extreme points is conducted reflexively in two routes of left upper, top, right upper and right, and left, left lower, bottom and right lower. In case that the note has a white circle pattern as shown in FIG. 22B, the search is conducted from the note center "*" in four directions horizontally and vertically to hit a certain mark dot. Then, the reflexive search is continued from the hit dot, thereby ensuring accurate determination of the stem end even if the original image contains a defect such as print blur of the given music score text. Further, the recognized object having a white circle shape is regarded as a whole note of a single tone, provided that one distance between the note head center and the rightwise uppermost point is not so different from another distance between the note head center and the leftwise lowermost point.

Then, Substep S54 is undertaken to count a number of beams or hooks, if any, along the stem from its tip end. Namely, as shown in FIG. 23, in case that the detected stem end "Δ" is located at a rightwise upper point, search is conducted vertically downward from a pair of start points which are offset leftwise and rightwise from the central stem end by a spacing D/2. During the searching, a number of continuous mark dots along the vertical section is measured. If the measured dot number falls within an expected range of the beam thickness determined in the preceding Substep S31, one beam is counted. In order to avoid inadvertently counting a black circle of chord notes as a beam, the vertical search will be stopped when a blank is continued for a certain interval after the last count of beam. On the other hand, if the detected stem end is located at a leftwise lower point from the note head center, the search is conducted vertically upward from a pair of start points which are offset leftwise and rightwise from the stem end. Then, a note length of a performance event on the investigation is determined by the counted number of the beam. In case that the leftside and rightside beam numbers are different from each other, the note length is determined according to the greater one of the counted beam numbers. For example, in the FIG. 23 event pattern, the central note on the investigation is determined to be a 16th note because of the rightside double beams having the priority to the leftside single beam.

Next, Substep S55 is undertaken for note dot detection. For example, as shown in FIG. 22A, searching is conducted over a rectangular area having a transvertical dimension of D measured from the note head center and a longitudinal dimension of D/3 to find a block of congregated mark dots having a significantly small size and a small variant. Such a tiny block is determined to be a note dot attributed to an adjacent note.

Lastly, Substep S56 is undertaken to determine a note length of each object according to the note head information obtained by Substep S43 and the beam or hook information obtained by Substeps S52 and S54. When the note has an accompanied note dot, the initial note length is added with a half thereof to fix the final note length. In this process, the total note length is checked for each of the measures based on the previously obtained positional information of the bars. For example, an occurrence of error may be judged when a certain measure contains a total length of 3.5 notes while the given musical score is assigned the time signature of 4/4.

Figures 24, 25:
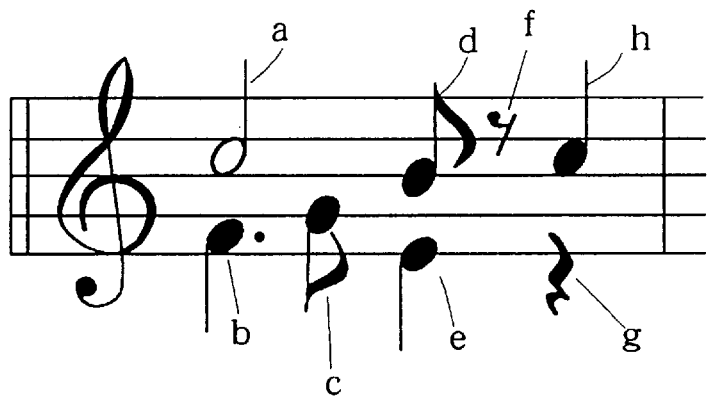
FIG. 24 is a diagram showing an example of a score subjected to the event determination.
FIG. 25 is a table diagram showing event determination results of the FIG. 24 score.

The thus obtained event recognition results are stored in the RAM 15 in a suitable format as a recognition consequence of the given musical score text. For example, a given musical score text shown in FIG. 24 is recognized and registered in a table list form as shown in FIG. 25. The FIG. 25 table contains various recognition results comprised of an event index, an event type, a note length in terms of clock numbers (24 clocks correspond to a quarter note length) and a chord flag indicative of concurrent sounding with other notes. The event index identifies involved notes a, b, c, d, e and h, and involved rests f and g. The event type represents either of note and rest, and further indicates tone pitches such as C4 and F3 in case of the note event. The chord flag has either of statuses "0" and "1". The status "1" indicates that a designated note is coupled to an immediately preceding note to constitute a chord.

Figure 26:
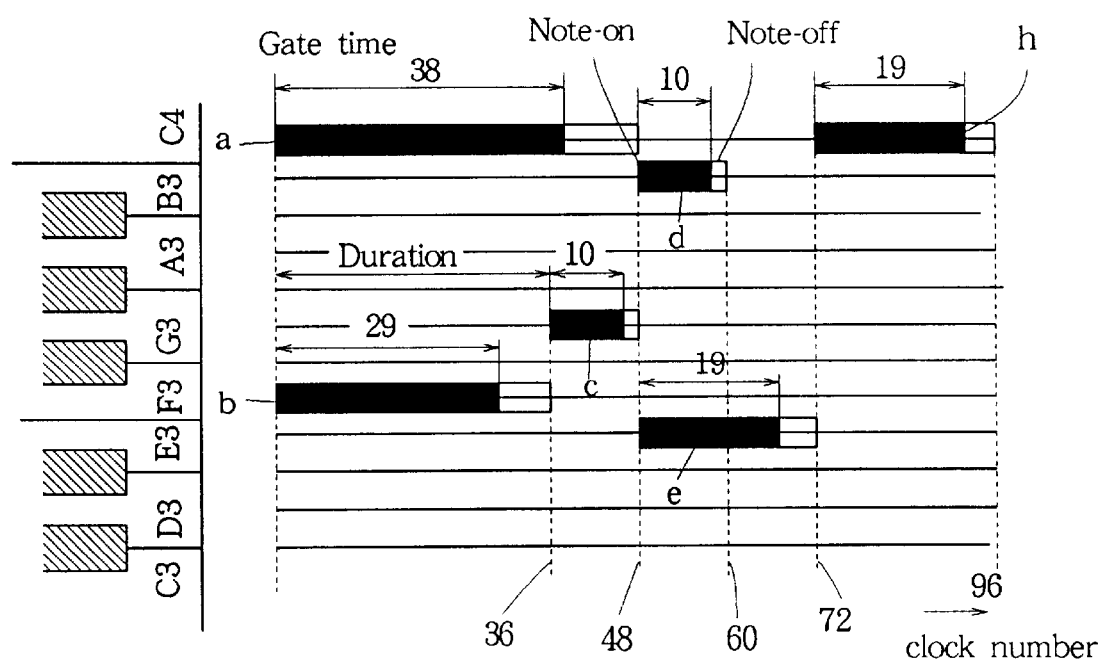
FIG. 26 is a time chart showing driving timings of a MIDI sound source according to the event determination results.

After finishing Step S6 of the event determination, next Step S7 is carried out based on the recognition results to form intermediate performance data which is utilized to produce final MIDI data. Namely, as shown in FIG. 26, it is necessary to determine a gate time between an actual note-on timing and an actual note-off timing based on each of the obtained note lengths for controlling the external MIDI sound source 2. The effective gate time is normally set shorter than the corresponding nominal note length. Further, it is necessary to determine a duration between a preceding note-on event and a succeeding note-on event. Thus, the recognized results represented by the FIG. 25 table data is processed to form the performance data containing the duration, the note number and the gate time.

Figure 27:
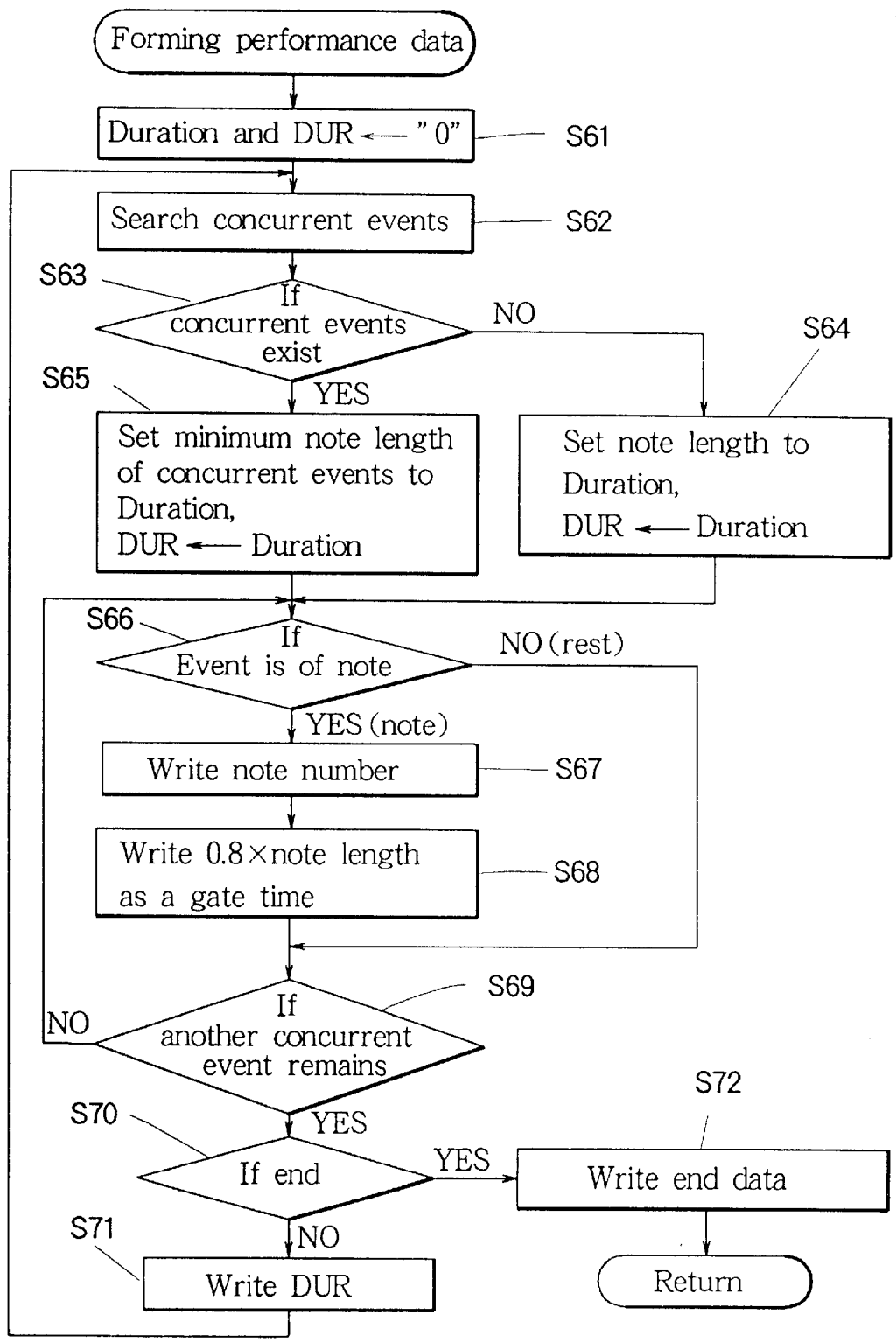
FIG. 27 is a flowchart showing performance data forming process.
Figures 28, 29:
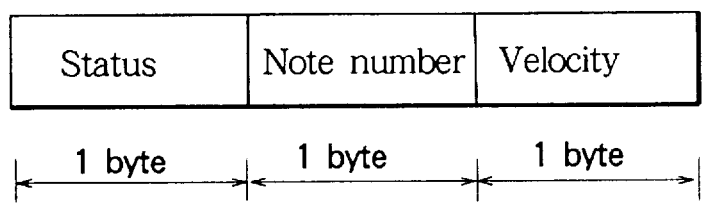
FIG. 28 is a diagram showing an example of performance data produced by the FIG. 27 process.
FIG. 29 is a diagram showing an example of MIDI data deduced from the FIG. 28 performance data.

FIG. 27 is a flowchart showing a detailed process of forming the performance data, and FIG. 28 is a diagram showing one example of the performance data. First, Substep S61 is undertaken to write a duration "0" at the start address to designate an occurrence timing of the first note event, and to concurrently reset a duration register DUR to "0". Then, Substeps S62 and S63 are undertaken to sequentially retrieve the events sorted along the staff in the order of earlier occurrence to later occurrence, as shown in FIG. 25. Further, judgement is made as to if there are concurrent events by checking if the chord flag has the status "1" for each note event. In case that there are no concurrent events, Substep S64 is undertaken to load a designated note length to the DUR as a next duration which identify a next event occurrence. On the other hand that there are concurrent events, Substep S65 is undertaken to load the shortest note length of the concurrent note events into the DUR as a next duration.

Next, Substep S66 is undertaken to check as to whether the designated event is of a note. In case of the note event, Substeps S67, S68 are undertaken to write a note number corresponding to the tone pitch of the designated note, and to write a corresponding gate time which is calculated by multiplying the nominal note length by a given rate 0.8. In practice, an actual sounding interval is normally set to 0.8 times as the nominal note length except for special performance manner such as slur and staccato. In case that there are concurrent events, a sequence of Substeps S66, S67 and S68 are repeatedly carried out to effect writing of the note number and the gate time for each of the concurrent notes until Substep S69 confirms that there is no remaining concurrent event. Then, Substep S71 is undertaken to write the content of the DUR as a duration data into a following address. In case that two duration data are written continuously into adjacent addresses without being interposed with a note address containing a note number and a gate time, i.e., in case that a rest event is interposed between consecutive note events, the two continuous duration data are added with each other to provide a new consistent duration data.

Lastly, Step S8 of the main routine is carried out to produce MIDI data based on the thus obtained performance data so as to drive the external MIDI sound source 2 to thereby effect automatic performance according to the given musical score text. In this embodiment, a periodic clock having a constant period according to a given tempo is continuously counted to measure a time. When a duration specified in the performance data is lapsed, a next MIDI note-on message is outputted. Then, a gate time is counted from a note-on timing in response to the clock. Upon detection of the lapse of the gate time, a subsequent MIDI note-off message is outputted. For example, as shown in FIG. 29, the MIDI data is comprised of three byte data. The first byte is a status byte indicative of note-on/note-off and a performance channel. The second byte is a note number byte indicative of a tone pitch. The third byte is a velocity byte indicative of a tone volume. In case that expression symbols such as accent, crescendo and decrescendo can be recognized, the velocity data may be formed according to the recognition results of these symbols. Otherwise, in case that these expression symbols are precluded from the recognizable objects, the velocity data may be inputted manually by means of the switch board 17.

By such a manner, a given music score text can be accurately recognized by a simplified process to thereby achieve faster processing speed and reduction in required memory capacity. Thus, a personal computer system can be practically utilized to enable reliable score recognition. In the above described embodiment, once the performance data is prepared according to the recognition results of the musical score, the final MIDI data is produced from the performance data. However, the MIDI data may be formed directly from the recognition results. Further, the determination method of the staff inclination is not limited to the disclosed embodiment, but the staff inclination may be calculated according to a level difference at opposite ends of the staff. Moreover, the incline compensation of the staff may be first executed relative to the vertical axis and then relative to the horizontal axis.

As described above, according to the first aspect of the invention, the inclination of the sampled score image can be corrected with respect to the horizontal axis so that the staff lines have a flat level from start edges to last edges, thereby ensuring exact note pitch determination. Further, the inclination of blocks of various components are corrected relative to the vertical axis to thereby ensure accurate recognition of notes, symbols and chords.

According to the second aspect of the invention, the staff lines can be exclusively erased while reserving other notes and symbols, thereby limiting a pattern matching area of the score image, and thereby avoiding the notes and symbols from inadvertent mutilation.

According to the third aspect of the invention, in addition to the staffs, beams are also provisionally removed to leave notes and symbols in separated states, thereby limiting a pattern matching zone of the score image, and thereby avoiding erroneous detection of a beam as a note.

According to the fourth aspect of the invention, during the course of object recognition process using a reference pattern composed of a discrete arrangement of characteristic positive and negative points, coincidence is tested between one characteristic point of the reference and plural dots of the object including not only a central dot but also peripheral dots. Therefore, the object recognition can be carried out accurately and flexibly even though the score image contains moderate deformation, blur and noise.

According to the fifth aspect of the invention, during the course of determining a sequence of performance events according to the score recognition results, a plurality of concurrent events are particularly identified, which occur at the same time. Further, a duration is determined between preceding concurrent events and a succeeding event according to a minimum time length of recognized notes involved in the preceding concurrent events. Consequently, an accurate duration can be determined by the simplified processing of the score recognition. Moreover, if a rest event is occasionally interposed between a preceding note event and a succeeding note event, a time length of a recognized rest is simply added to a time length of the preceding note to thereby consistently determine the event duration.

Lastly, as consequence of the first to fifth aspects of the invention, efficient recognition of the musical score can be realized with a reduced computation volume to thereby ensure accurate and fast reading of performance events written on the musical score text.

What is claimed is:

1. In a musical score recognition apparatus for recording an image of a given musical score in the form of a two dimensional array of mark and space dots and for processing the recorded image to thereby recognize various components including staffs, notes and symbols so as to produce performance information according to the recognized components, an inclination compensation apparatus comprising:

staff discriminating means for discriminating a staff from the recorded image;

inclination detecting means for detecting an inclination of segments of the discriminated staff to calculate an inclination angle of the segments, wherein each segment may have a different inclination angle;

first inclination compensating means for longitudinally shifting the mark dots according to the calculated inclination angle of a corresponding segment so as to compensate the recorded image for the detected inclination with respect to a horizontal axis;

second inclination compensating means for laterally shifting the mark dots according to the calculated inclination angle of a corresponding segment so as to compensate the recorded image for the detected inclination with respect to a vertical axis; and position determining means for determining a position of each component based on a compensated image.

2. An apparatus according to claim 1; wherein the first inclination compensating means includes means for dividing each inclined line of the staff into a sequence of longitudinal segments composed of mark dots, and means for shifting vertically the respective longitudinal segments to align along a straight horizontal line.

3. An apparatus according to claim 2, wherein the position determining means comprises:

staff position determining means for processing the compensated image according to longitudinal blocks of congregated mark dots to recognize each staff line to thereby determine a position and a thickness of each staff line;

block searching means for searching every block of congregated mark dots having a width comparable to a predetermined thickness and extending along the determined position of each staff line in the compensated image;

block selecting means for selecting each block having a length greater than a predetermined note and symbol horizontal length;

block erasing means for exclusively erasing all the selected longitudinal blocks to prepare a working image substantially free of the staff lines; and note and symbol position determining means for processing the working image to recognize notes and symbols to determine positions thereof.

4. An apparatus according to claim 1; wherein the second inclination compensating means includes means for dividing each component into segments composed of congregated mark dots, and means for shifting horizontally the respective segments to reshape each component.

5. In a musical score recognition apparatus for recording an image of a given musical score in the form of a two dimensional array of mark and space dots and for processing the recorded image to thereby recognize various components including staff lines, notes and symbols so as to produce performance information according to the recognized components, a staff erasing apparatus comprising:

means for forming longitudinal blocks of congregated mark dots;

staff position determining means for processing the recorded image according to longitudinal blocks of congregated mark dots to recognize each staff line to thereby determine a position and a thickness of each staff line;

block searching means for searching every block of congregated mark dots having a width comparable to a predetermined thickness and extending along the determined position of each staff line in the recorded image;

block selecting means for selecting each longitudinal block having a horizontal length greater than a predetermined note and symbol horizontal length;

block erasing means for exclusively erasing all the selected longitudinal blocks to prepare a working image substantially free of the staff lines; and note and symbol position determining means for processing the working image to recognize notes and symbols to determine positions thereof.

6. An apparatus according to claim 5, wherein the block searching means concludes the search for a selected block when the vertical width of a selected block increases beyond a predetermined margin, indicating the presence of a note or symbol overlapping the staff.

7. An apparatus according to claim 5, wherein the block erasing means erases all the selected longitudinal blocks except for a certain longitudinal margin at each end of the selected longitudinal block to prepare a working image substantially free of the staff lines which does not distort the objects during the erasure of staff lines.

8. In a musical score recognition apparatus for recording an image of a given musical score in the form of a two dimensional array of mark and space dots and for processing the recorded image to thereby recognize various components including staffs, notes and symbols so as to produce performance information according to the recognized components, a beam erasing apparatus comprising:

means for forming longitudinal blocks of congregated mark dots;

staff discriminating means for discriminating a staff from the recorded image;

inclination detecting means for detecting an inclination of segments of the discriminated staff to calculate an inclination angle of the segments, wherein each segment may have a different inclination angle;

first inclination compensating means for longitudinally shifting the mark dots according to the calculated inclination angle of a corresponding segment so as to compensate the recorded image for the detected inclination with respect to a horizontal axis;

second inclination compensating means for laterally shifting the mark dots according to the calculated inclination angle of a corresponding segment so as to compensate the recorded image for the detected inclination with respect to a vertical axis;

staff erasing means for provisionally erasing recognized staffs from the recorded image to prepare a first working image;

range setting means for setting a test range according to longitudinal blocks of congregated mark dots in terms of a width, a length and a tilt, which characterize a typical beam extending between adjacent notes;

block searching means for scanning the first working image to select each block of congregated mark dots having a width, a length and a tilt which satisfy the set test range;

block erasing means for erasing all the selected blocks from the first working image to prepare a second working image substantially free of beams initially contained in the recorded image; and note and symbol position determining means for processing the second working image to recognize notes and symbols to determine positions thereof.

9. In a musical score recognition apparatus for recording an image of a given musical score in the form of a two dimensional array of mark and space dots and for processing the recorded image to thereby recognize various objects including notes and symbols so as to produce performance information according to the recognized objects, an object recognition apparatus comprising:

extracting means for extracting from the recorded image an individual object which is superposed with a portion of a staff line;

reference storing means for storing a reference pattern of each object, each reference pattern composed of a discrete arrangement of positive and negative points characteristic of a corresponding object, each positive point being located where the corresponding object should have a mark dot and each negative point being located where the corresponding object should have a space dot;

object matching means for matching an object extracted from the recorded image relative to a respective one of the reference patterns to calculate a matching degree according to a rate of coincidence between each positive and negative point of said reference pattern and a given point of the object as well as a group of dots at and around the given point of the object;

object recognizing means for identifying a particular reference pattern corresponding to the object according to the calculated matching degree to thereby recognize the object; and wherein the reference storing means comprises means for storing each reference pattern having positive points which may successfully compare with the object superposed with the portion of the staff line.

10. In a musical score recognition method for recognizing various components of a given musical score including staffs, notes and symbols so as to produce performance information according to the recognized components, an inclination compensation method comprising the steps of:

recording an image of the given musical score in the form of a two dimensional array of mark and space dots;

discriminating a staff from the recorded image;

detecting an inclination of segments of the discriminated staff to calculate an inclination angle of the segments, wherein each segment may have a different inclination angle;

shifting the mark dots longitudinally according to the calculated inclination angle of a corresponding segment so as to compensate the recorded image for the detected inclination with respect to a horizontal axis;

shifting the mark dots laterally according to the calculated inclination angle of a corresponding segment so as to compensate the recorded image for the detected inclination with respect to a vertical axis; and determining a position of each component based on a compensated image.

11. In a musical score recognition method for recognizing various components of a given musical score including staff lines, notes and symbols so as to produce performance information according to the recognized components, a staff erasing method comprising the steps of:

recording an image of the given musical score in the form of a two dimensional array of mark and space dots;

forming longitudinal blocks of congregated mark dots;

processing the recorded image according to longitudinal blocks of congregated mark dots to recognize each staff line to thereby determine a position and a thickness of each staff line;

searching every block of congregated mark dots having a width comparable to a predetermined thickness and which extends along the determined position of each staff line in the recorded image;

selecting each longitudinal block which has a length greater than a predetermined note and symbol horizontal length;

exclusively erasing all the selected longitudinal blocks to prepare a working image substantially free of the staff lines; and processing the working image to recognize notes and symbols to determine positions thereof.

12. In a musical score recognition method for recognizing various components of a given musical score including staffs, notes and symbols so as to produce performance information according to the recognized components, a beam erasing method comprising the steps of:

recording an image of the given musical score in the form of a two dimensional array of mark and space dots;

forming longitudinal blocks of congregated mark dots;

discriminating a staff from the recorded image according to longitudinal blocks of congregated mark dots;

detecting an inclination of segments of the discriminated staff to calculate an inclination angle of the segments, wherein each segment may have a different inclination angle;

shifting the mark dots longitudinally according to the calculated inclination angle of a corresponding segment so as to compensate the recorded image for the detected inclination with respect to a horizontal axis;

shifting the mark dots laterally according to the calculated inclination angle of a corresponding segment so as to compensate the recorded image for the detected inclination with respect to a vertical axis; and provisionally erasing recognized staffs from the recorded image to prepare a first working image;

setting a test range according to longitudinal blocks of congregated mark dots in terms of a width, a length and a tilt, which characterize a typical beam extending between adjacent notes;

scanning the first working image to select each block of congregated mark dots having a width, a length and a tilt which satisfy the set test range;

erasing all the selected blocks from the first working image to prepare a second working image substantially free of beams initially contained in the recorded image; and processing the second working image to recognize notes and symbols to determine positions thereof.

13. In a musical score recognition method for recognizing various objects of a given musical score including notes and symbols so as to produce performance information according to the recognized objects, an object recognition method comprising the steps of:

recording an image of the given musical score in the form of a two dimensional array of mark and space dots;

extracting from the recorded image an individual object which is superposed with a portion of a staff line;

preparing a reference pattern of each object, each reference pattern composed of a discrete arrangement of positive and negative points characteristic of a corresponding object, each positive point being located where the corresponding object should have a mark dot and each negative point being located where the corresponding object should have a space dot;

matching an object extracted from the recorded image relative to a respective one of the reference patterns to calculate a matching degree according to a rate of coincidence between each positive and negative point of said reference pattern and a given point of the object as well as a group of dots at and around the given point of the object;

identifying a particular reference pattern corresponding to the object according to the calculated matching degree to thereby recognize the object; and storing each reference pattern having positive points which may successfully compare with the object superposed with the portion of the staff line.

* * * * *